US008667595B2

(12) United States Patent
Sedayao

(10) Patent No.: US 8,667,595 B2
(45) Date of Patent: Mar. 4, 2014

(54) METHOD, APPARATUS AND SYSTEM FOR CONTAINING AND LOCALIZING MALWARE PROPAGATION

(75) Inventor: Jeff Sedayao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1502 days.

(21) Appl. No.: 11/967,575

(22) Filed: Dec. 31, 2007

(65) Prior Publication Data

US 2009/0172817 A1 Jul. 2, 2009

(51) Int. Cl.
*H04L 29/06* (2006.01)

(52) U.S. Cl.
USPC .............................. 726/25; 726/24; 713/188

(58) Field of Classification Search
USPC ........................................................ 726/23, 25
See application file for complete search history.

(56) References Cited

U.S. PATENT DOCUMENTS

| 7,409,719 B2* | 8/2008 | Armstrong et al. ............. 726/24 |
| 2004/0010787 A1* | 1/2004 | Traut et al. ........................ 718/1 |
| 2004/0103314 A1* | 5/2004 | Liston ............................ 713/201 |
| 2005/0108709 A1* | 5/2005 | Sciandra et al. .................. 718/1 |
| 2007/0250930 A1* | 10/2007 | Aziz et al. ........................ 726/24 |
| 2008/0235769 A1 | 9/2008 | Purcell et al. |

OTHER PUBLICATIONS

BAIT-TRAP: a Catering Honeypot Framework, Jiang et al., Aug. 2004, Department of Computer Science, Purdue University, Technical Report CSD TR 04-0xx.*

* cited by examiner

*Primary Examiner* — Mohammad L Rahman
(74) *Attorney, Agent, or Firm* — Schwabe, Williamson & Wyatt, P.C.

(57) ABSTRACT

A method, apparatus and system contain and localize malware propagation. In one embodiment, a security scheme may identify worm traffic that attempts to probe an unused network location. The security scheme may then in conjunction with a routing component, reroute the worm traffic to a contained and localized location. In one embodiment, the contained and localized location is a virtual machine (VM) within a virtualized platform. In other embodiments, the contained and localized location is a computer system on a network.

10 Claims, 4 Drawing Sheets

METHOD, APPARATUS AND SYSTEM FOR CONTAINING AND LOCALIZING MALWARE PROPAGATION

BACKGROUND

As computer networks continue to grow exponentially, a variety of malicious software schemes (also known as "malware") have also emerged. These malware schemes include viruses, worms and other such mechanisms by which unauthorized third parties may attempt to compromise computer systems and/or networks. Computer worms, for example, scan for computers within a computer network that may be vulnerable to an attack. Despite efforts such as firewalls and/or security software, worms may nonetheless propagate onto various computers on a network and cause significant damage.

More specifically, worms typically propagate by probing various network locations to determine whether it can propagate itself into that network location. Thus, if it identifies a computer system that is vulnerable (e.g., not protected by a firewall), the worm may execute code on the computer system that enables the worm to propagate itself onto that device. The worm may then spread itself to other network locations within that computer system's local network as well as concurrently propagate itself onto other computers accessible by the first computer system.

Thus, for example, if a worm probes a network address and finds a security vulnerability within that location, it may copy itself to the second network location and execute the executable code again, which propagates the worm to the other network location. This may continue until host and networks are slowed down to a crawl by the large number of worms, each of which may be consuming a significant amount of processor and network resources.

One scheme to prevent the proliferation of worms on a network uses the concept of "tarpits." If a network utilizes tarpits, a security system or security routine may be programmed to recognize all valid addresses and ports on the network and any attempts to access the unused network addresses and ports may be deemed to be unauthorized access attempts. The security system may be programmed to issue a "busy," "wait," or "retry" response, which essentially occupies the scanning capabilities of the worms. As a result, the worms' ability to spread becomes increasingly limited.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for containing and localizing malware propagation. Generally, a system and/or network may be monitored for malware intrusion. If such intrusion is detected (e.g., an attempt to access unauthorized or non-existent network locations), in one embodiment, the malware traffic may be rerouted to a tarpit and slowed down, thus avoiding the entire platform and/or network from becoming infected. Tarpits are well known to those of ordinary skill in the art and further description thereof is omitted herein. Additionally, hereafter, worms are used as exemplary malware to describe various aspects of the invention, but embodiments of the invention are not so limited. Other types of malware may also utilize schemes similar to those described herein.

Additionally, reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

According to embodiments of the present invention, virtualization technology may be leveraged on a per-computer basis to provide a first level of containment and localization. Thereafter, embodiments of the invention may also provide a second level of containment and localization at the network level. Details of these various embodiments are described in further detail below.

Figure 1:
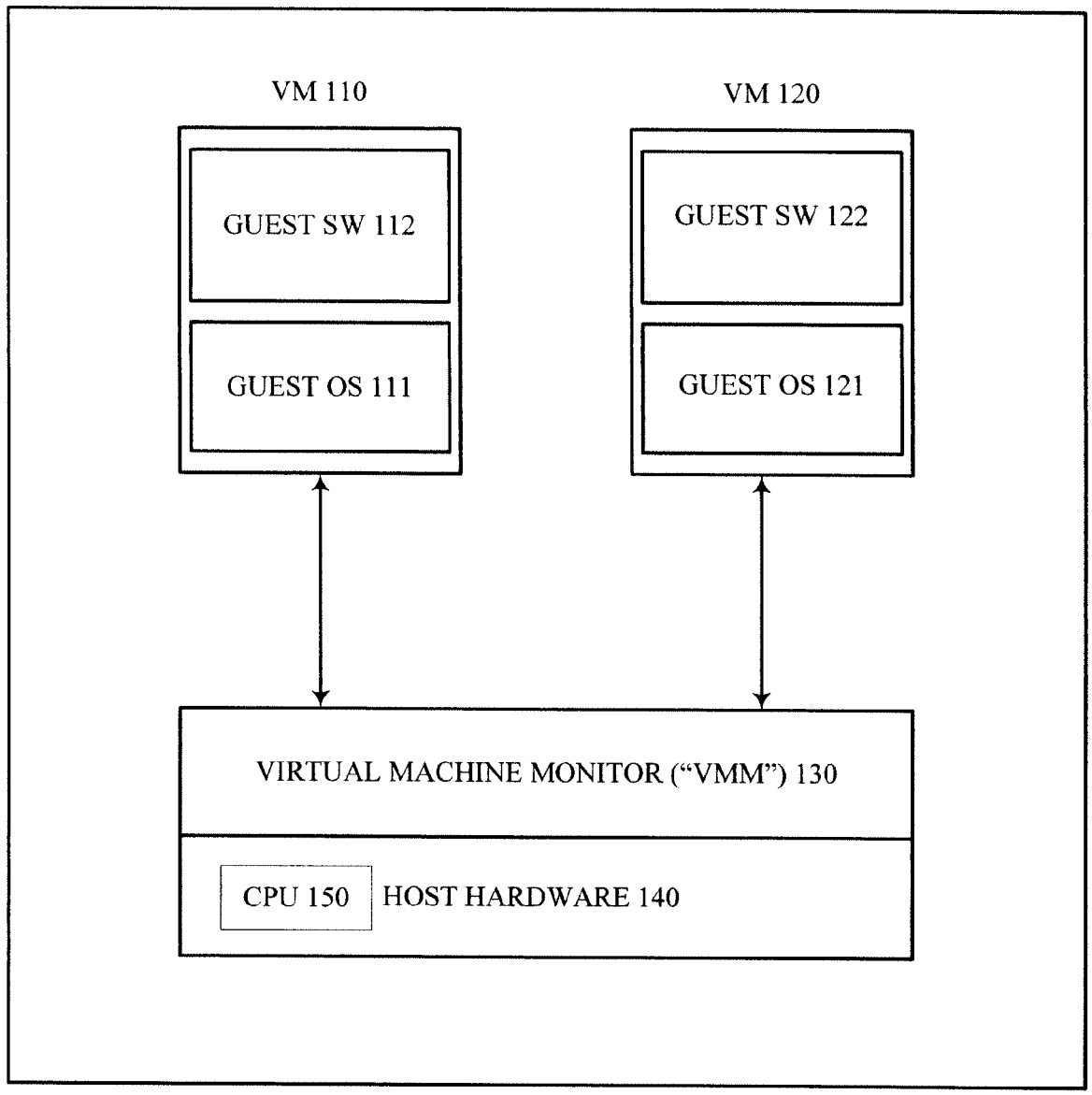
FIG. 1 illustrates an example of a typical virtual machine host.

In order to facilitate understanding of embodiments of the invention on a virtualized computer system, the following is a general description of a virtual platform. FIG. 1 illustrates an example of a typical virtual machine host platform ("Host 100") having a virtual-machine monitor ("VMM 130") that presents an abstraction(s) and/or view(s) of the platform (also referred to as "virtual machines" or "VMs") to other software. Although only two VM partitions are illustrated ("VM 110" and "VM 120", hereafter referred to collectively as "VMs"), these VMs are merely illustrative and additional virtual machines may be added to the host. VMM 130 may be implemented in software (e.g., as a standalone program and/or a component of a host operating system), hardware, firmware and/or any combination thereof.

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software may operate as if it were running on a dedicated computer. That is, each Guest OS and/or Guest Software may expect to control various events and have access to hardware resources on Host 100. Within each VM, the Guest OS and/or Guest Software may behave as if they were, in effect, running on Host 100's physical hardware ("Host Hardware 140", including "CPU 150")). VMM 130 may be "hosted" (i.e., a VMM that is started from and under the control of a host operating system) or unhosted (e.g., a "hypervisor"). In either scenario, each Guest OS in the VMs believes that it fully "owns" Host 100's hardware.

Figure 2:
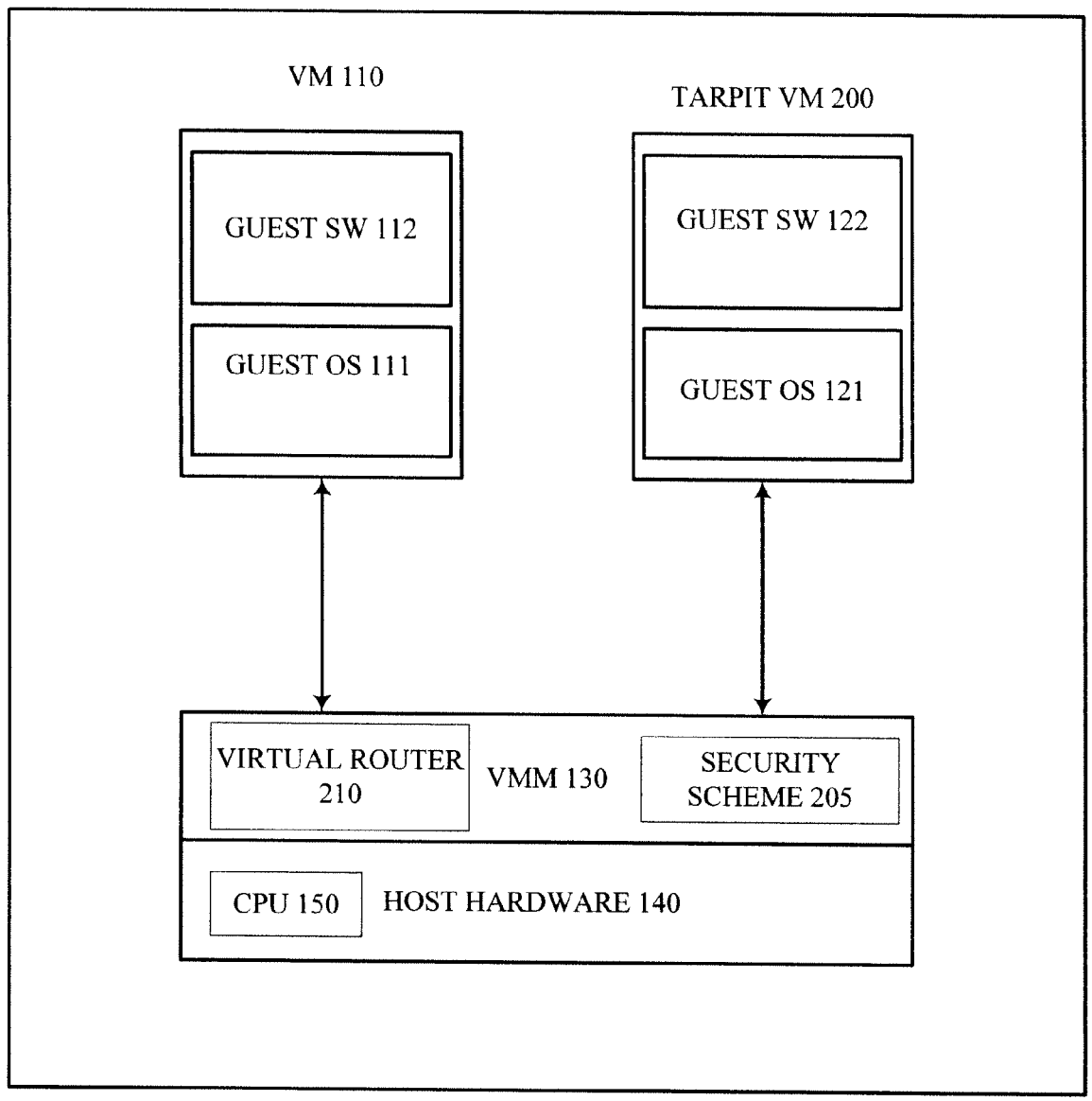
FIG. 2 illustrates an embodiment of the invention that leverages the virtual machine host.

In one embodiment of the invention, Guest VM 120 may be designated a tarpit. As illustrated in FIG. 2, Tarpit VM 200 may reside within Host 200, together with Guest VM 110 and VMM 130. Additionally, Host 100 may include a security scheme ("Security Scheme 205") and a virtual router ("Virtual Router 210"), coupled to VMM 130. Although illustrated as separate components, Security Scheme 205 may be implemented separately or together with Virtual Router 210 without departing from the spirit of embodiments of the present invention. Security Scheme 205 may identify worm traffic and in conjunction with Virtual Router 210, reroute the worm traffic to Tarpit VM 200. Although both Security Scheme 205 and Virtual Router 210 are illustrated as residing within VMM 130, embodiments of the invention are not so limited. Thus, for example, Security Scheme 205 may comprise a standalone component that is coupled to VMM 130. Similarly, Virtual Router 210 may comprise a standalone component that is coupled to VMM 130 and works in conjunction with VMM 130 to route worm traffic to Tarpit VM 200. By routing all worm traffic to an isolated VM, embodiments of the present invention enable the other partitions on Host 100 to remain uninfected.

Once within Tarpit VM 200, the worm traffic may be handled in a variety of ways. In one embodiment, for example, Tarpit VM 200 may issue connection commands, setting a Transport Control Protocol (TCP) window size to zero, thus leaving the worm's connection requests waiting indefinitely. Tarpit VM 200 may also be configured to send an alert to a security console and make a request for technicians to examine the system. In yet another example, Tarpit Vm 200 may start a protracted conversation with the worm in order to consume the resources on the system the worm is on.

Figure 3:
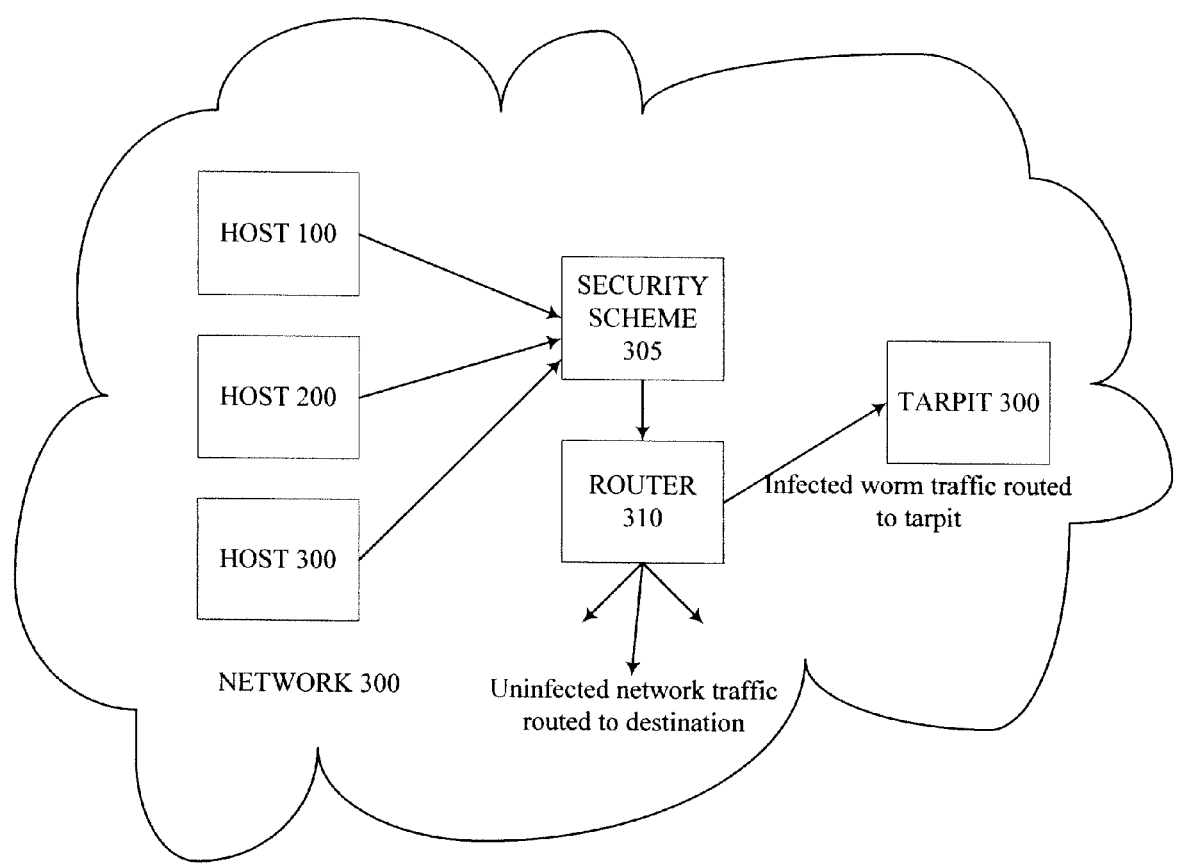
FIG. 3 illustrates an embodiment of the invention within a network.

In the event the worm on Host 100 probes network locations outside the host, e.g., on the network that Host 100 is part of, the worm may propagate to other computer systems on the network. Embodiments of the present invention also include a second level of containment and localization for the network. Thus, FIG. 3 illustrates an embodiment of the present invention directed to containing and localizing worm traffic on a network. As shown in FIG. 3, Network 300 may include multiple hosts (illustrated as Host 100, Host 200 and Host 300, although embodiments of the invention may include unlimited numbers of hosts). As illustrated, in one embodiment of the invention, a security scheme ("Security Scheme 305") may be implemented on Network 300. For example, Security Scheme 305 may identify worm traffic and in conjunction with Router 310, reroute the worm traffic to Tarpit 300.

Again, although both Security Scheme 305 and Router 310 are illustrated as separate components, embodiments of the invention are not so limited. Thus, for example, Security Scheme 205 may be implemented within Router 305 to reroute the traffic. Additionally, although Tarpit 300 is illustrated as a standalone computer in FIG. 3, embodiments of the invention are not so limited and in alternate embodiments, Tarpit 30 may be implemented on a plurality of computer systems and/or in a VM on one or more computer systems. Most importantly, regardless of the embodiment, the worm traffic may be contained and localized within a known structure and propagation may be minimized.

Thus, embodiments of the invention enable worm traffic to be contained and localized. Most importantly, embodiments of the invention provide the ability to actively determine predefined locations to which the worm traffic may be rerouted. This proactive scheme differs significantly from other existing schemes that utilize tarpits. One alternative scheme is described in co-pending U.S. application Ser. No. 11/689,022, entitled "Adaptive Tarpits Using Distributed Virtual Machines" (filed on Mar. 21, 2007, also owned by the owner of the present application, hereafter referred to as the "'022 application"). According to embodiments of the '022 application, tarpits are distributed widely across a network, in contrast with embodiments of the present invention wherein worm traffic is contained and localized to the largest extent possible, thus minimizing propagation. In other words, embodiments of the present invention contain the worm traffic as closely as possible to the infected system and prevents it from moving to other locations that are uninfected. Thus, this scheme enables fewer tarpits to be employed than the '022 application referred to above.

Figure 4:
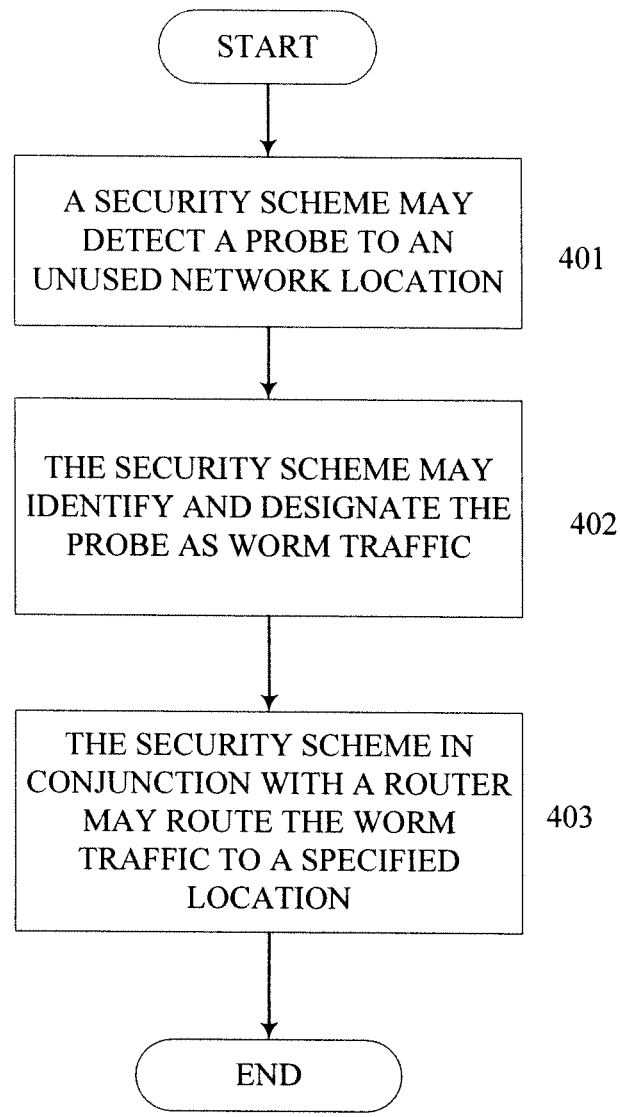
FIG. 4 is a flowchart of an embodiment of the invention.

FIG. 4 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 401, a security scheme may detect a probe to unused network locations. In 402, the security scheme may identify and designate the request as worm traffic and in 403, the security scheme in conjunction with a router may reroute the worm traffic to a specified location. In one embodiment, the specified location may be a VM within a virtualized computer system, the VM being designated a tarpit. In an alternate embodiment, the specified location may be a standalone computer on a network Embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:

detecting, by a virtual machine manager of a host computer, worm traffic originated from a first virtual machine of the host computer and directed to an address of a network; and rerouting, by the virtual machine manager, the detected worm traffic to a second virtual machine of the host computer to prevent the worm traffic from propagating to the designated address; and causing, by the virtual machine manager, the rerouted worm traffic to be contained within the second virtual machine, wherein the virtual machine manager is configured to manage the first and the second virtual machine of the host computer, wherein the first and second virtual machines reside on the host computer and wherein the second virtual machine is configured to contain the worm traffic within the second virtual machine by issuing a connection command setting a transport control protocol (TCP) window size to zero.

2. The method of claim 1, wherein the worm traffic is designated to an unauthorized network location.

3. A system, comprising:
   memory configured to receive network traffic; and
   a virtual machine manager coupled to the memory and configured to manage a first and a second virtual machine of the system, wherein the virtual machine manager includes:
   a security scheme configured to detect worm traffic from the network traffic,
   wherein the detected worm traffic is originated from the first virtual machine and designated to an address of a network; and
   a router coupled to the security scheme and configured to reroute the detected worm traffic to the second virtual machine to prevent the detected worm traffic from propagating to the designated address; and
   wherein the second virtual machine is configured to contain the detected worm traffic within the second virtual machine by issuing a connection command setting a transport control protocol (TCP) window size to zero wherein the first and second virtual machines reside on a host computer of the system.

4. The system of claim 3 wherein the security scheme is integrated with the router.

5. An article of manufacture, comprising:
   a tangible and non-transitory machine-accessible medium having stored thereon instructions that, upon execution by a virtual machine manager of a host computer, cause the virtual machine manager to perform operations including:
   detecting worm traffic originated from a first virtual machine of the host computer, wherein the worm traffic is designated to an address of a network;
   rerouting the worm traffic to a second virtual machine of the host computer to prevent the worm traffic from propagating to the designated address; and
   causing the worm traffic to be contained within the second virtual machine,
   wherein the second virtual machine is configured to contain the worm traffic within the second virtual machine by issuing a connection command setting a transport control protocol (TCP) window size to zero,
   wherein the virtual machine manager is configured to manage the first and the second virtual machines of the host computer, wherein the first and second virtual machines reside on the host computer.

6. The article of claim 5, wherein the worm traffic is designated to an unauthorized network location.

7. The method of claim 1, further comprising:
   containing, by the second virtual machine, the rerouted worm traffic within the second virtual machine by:
   setting a transport control protocol (TCP) window size to zero,
   starting a protracted conversation with a sender of the worm traffic to consume resources of the first virtual machine, or
   sending an alert to a security console.

8. The system of claim 3, wherein the security scheme is configured to detect worm traffic by being configured to determine whether the network traffic includes a probe to an unused network address or ports.

9. The system of claim 5, wherein the second virtual machine is configured to contain the worm traffic within the second virtual machine by setting a transport control protocol (TCP) window size to zero, starting a protracted conversation with a sender of the worm traffic to consume resources of the first virtual machine, or sending an alert to a security console.

10. The article of claim 5, wherein the second virtual machine is configured to contain the worm traffic within the second virtual machine by setting a transport control protocol (TCP) window size to zero, starting a protracted conversation with a sender of the worm traffic to consume resources of the first virtual machine, or sending an alert to a security console.

\* \* \* \* \*